Aug. 2, 1938.  E. P. OSWALD  2,125,309

DYNAMO-ELECTRIC MACHINE

Original Filed April 30, 1934  3 Sheets-Sheet 1

INVENTOR.
Earl P. Oswald
BY
Bay, Oberlin & Bay
ATTORNEYS.

Aug. 2, 1938.  E. P. OSWALD  2,125,309
DYNAMO-ELECTRIC MACHINE
Original Filed April 30, 1934  3 Sheets-Sheet 2
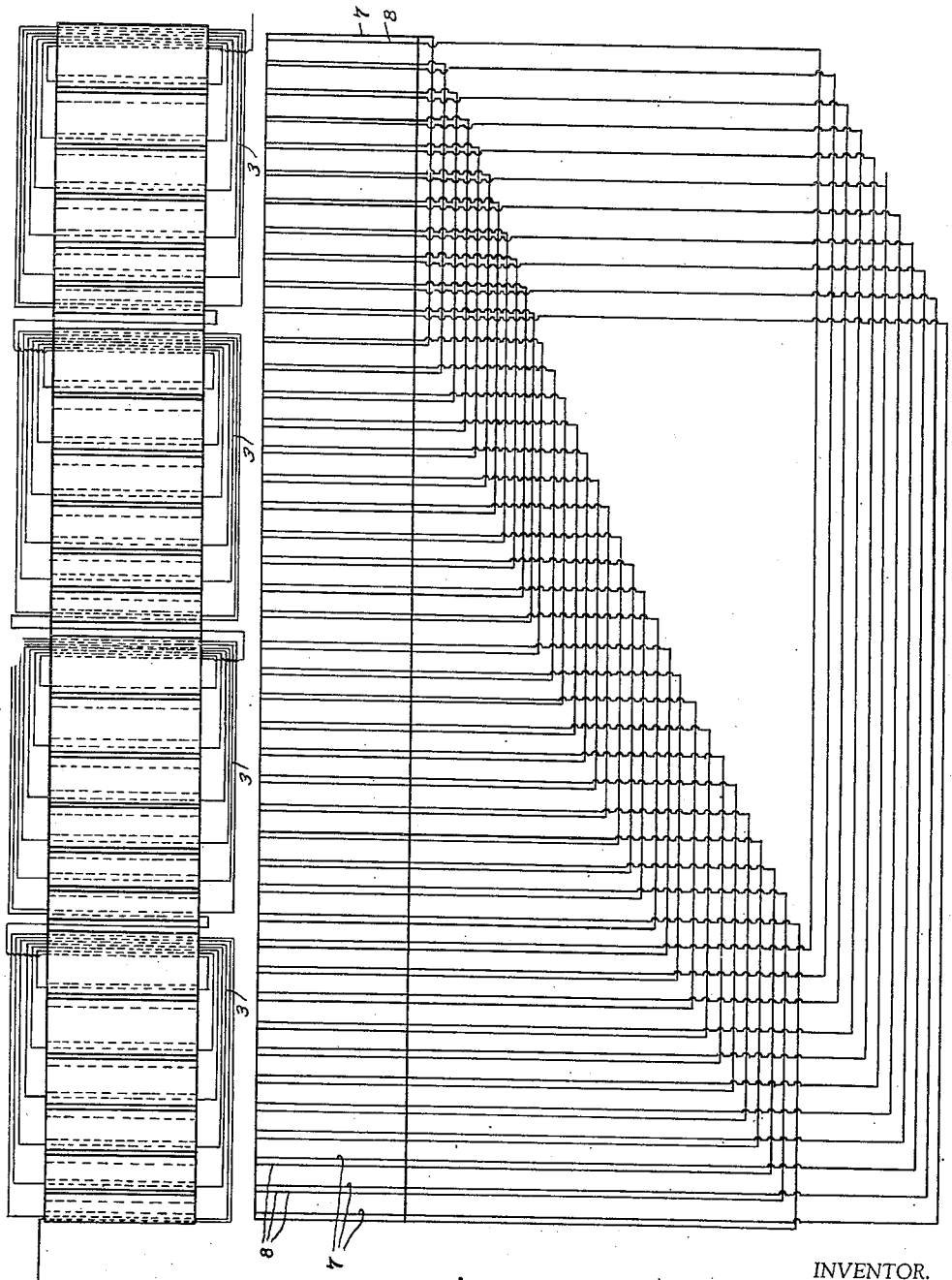
INVENTOR.
Earl P. Oswald
BY
Bayh, Oberlin & Bay
ATTORNEYS.

Aug. 2, 1938.   E. P. OSWALD   2,125,309
DYNAMO-ELECTRIC MACHINE
Original Filed April 30, 1934   3 Sheets-Sheet 3

INVENTOR.
BY  Earl P. Oswald
Pray, Oberlin & Pray
ATTORNEYS.

Patented Aug. 2, 1938

2,125,309

UNITED STATES PATENT OFFICE 2,125,309

DYNAMO-ELECTRIC MACHINE

Earl P. Oswald, Ferndale, Mich.

Application April 30, 1934, Serial No. 723,239
Renewed October 27, 1937

5 Claims. (Cl. 172—275)

This invention relates as indicated to dynamo electric machines and more particularly to alternating-current motors.

It is the primary object of my invention to provide a self-starting single-phase alternating-current motor having a sufficiently high starting torque so as not to require the use of special starting windings or other appliances.

It is a further object of my invention to provide a single-phase alternating-current motor having improved torque-speed characteristics.

Other objects of my invention will appear as the description proceeds.

To the accomplishment of the foregoing and related ends, said invention, then consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings—

Figure 1:
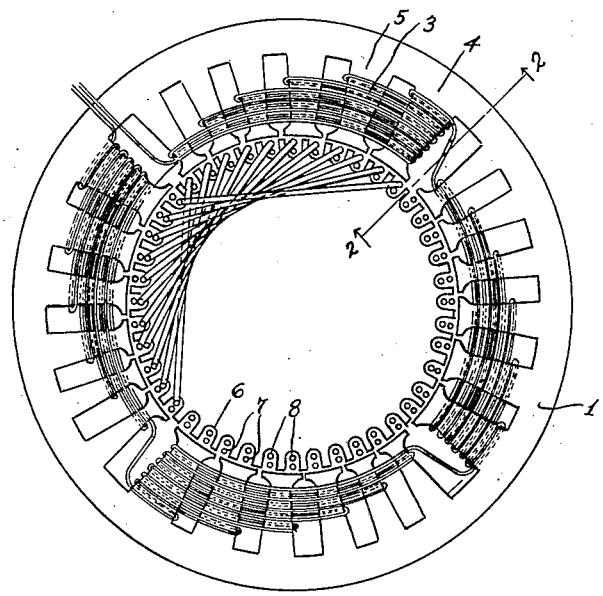
Figure 2:
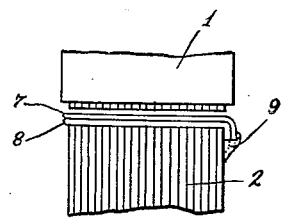
Figure 3:
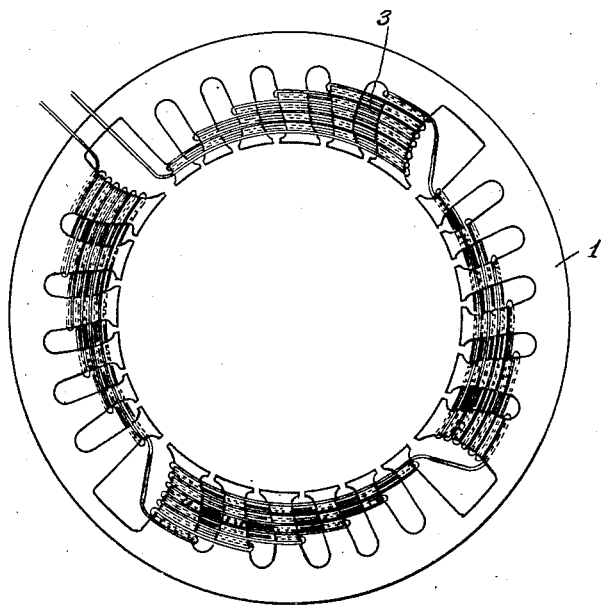
Figure 4:
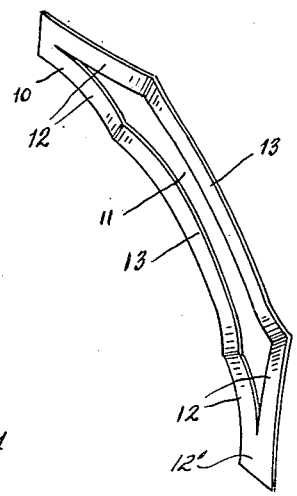
Figure 7:
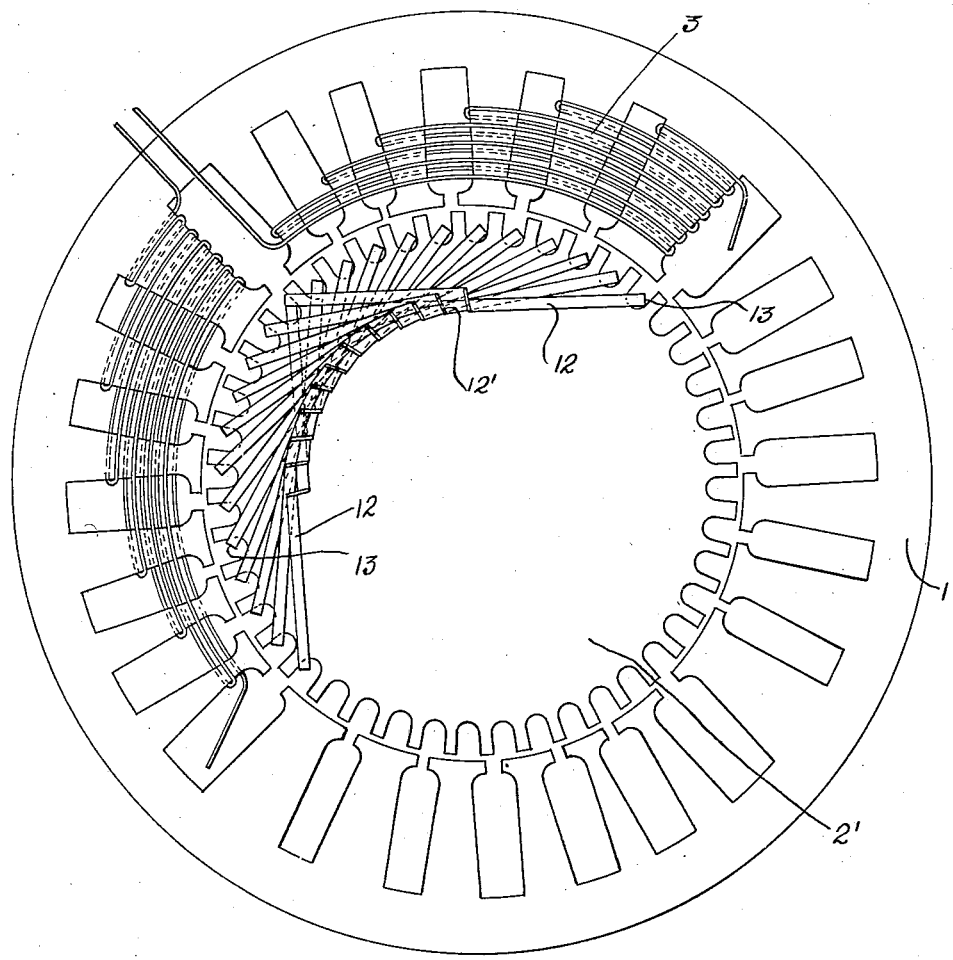

Fig. 1 is an end elevational view of the stator and rotor units of a motor constructed in accordance with my invention; Fig. 2 is a fragmentary transverse sectional view of a portion of the assembly illustrated in Fig. 1 taken on a plane substantially indicated by the line 2—2; Fig. 3 is a view similar to Fig. 1 but showing a modified form of stator construction; Fig. 4 is a perspective view of a specially formed element which may be utilized to provide the rotor bars of the construction illustrated in Fig. 1; Fig. 5 is a developed view of the stator wound as illustrated in Fig. 1; Fig. 6 is a developed view of the rotor wound as illustrated in Fig. 1; and Fig. 7 is an end elevational view of stator and rotor units wherein the rotor includes the modified form of rotor bars shown in Fig. 4.

Referring now more specifically to the drawings and more especially to Fig. 1, it will be noted that the motor here illustrated may be generally classified as of the induction type and comprises a stator assembly generally indicated at 1 and a rotor assembly generally indicated at 2. Both the rotor and stator assemblies are different from those usually found in the conventional type induction motor.

As above indicated, my invention relates particularly to the provision of a single-phase self-starting alternating-current motor having improved starting torque characteristics. The motor is rendered self-starting by the asymmetrical arrangement of the field windings 3 about the axes of the respective poles of the stator. When the several field windings arranged as illustrated are energized by means of alternating current, the asymmetrical magnetic field will, in the well-recognized manner, cause a rotation of the rotor.

I have discovered that the operating characteristics of the machine such as its starting torque, etc., may be improved if the width of the stator teeth about which the field windings 3 are wound is varied in size so as to bear substantially the same cross-sectional proportional relationship as the flux densities in such teeth resulting from the asymmetrical arrangement of the field windings. To accomplish this end, it will be noted that the teeth such as 4 carrying the greatest number of turns are appreciably wider than the next succeeding teeth such as 5 carrying fewer ampere turns. The exact width and other dimensions of the teeth may be accurately determined by calculation and test to determine the number of ampere turns each tooth will be required to carry. This, of course, will vary with machines of different size so that it is not possible to, at this point, give a definite value for the size of the teeth or the particular proportional relationship therebetween other than to state that such proportional relationship should be in direct ratio to the ampere turn excitation to which the tooth is subjected.

The rotor 2 is provided with a plurality of circumferentially spaced axially extending rotor bar slots generally indicated at 6. In each of these slots there are positioned two conductors or bars, the outer bars being numbered 7 and the inner 8. All of the bars 7 and 8 are at one end secured to a ring 9 which serves as a common return for all of the bars. The other ends of the bars are connected in pairs, i. e., the bar 7 in each slot is connected in series with the bar 8 in another slot removed for distance preferably equal to the pole pitch of the machine. For example, let us assume, as illustrated in the drawings, that the motor is of the 4-pole type with successive poles of opposite polarity and there are forty-four slots in the rotor. There will, therefore, be eleven slots in the rotor under each pole span of the stator. The bar 7 in the first slot under the north pole of the machine will be connected in series with bar 8 in the first slot under a south pole of the machine, i. e., corresponding bars under successive poles of different polarity are connected in series with each other. When the rotor bars are connected in this fashion the induced E. M. F. in both bars of each pair will be in the same direction in the loop formed by such pair. The bars and their connections are preferably provided with insulating sheaths so as to insure a distribution of the induced current flow in the rotor as above explained.

The above outlined mode of connecting the rotor bars is the one which is preferred. It is to be understood, of course, that the bars may be connected in pairs in a somewhat different sequence than that explained in order to appreciate at least some of the advantages of this type of rotor. It should, furthermore, be noted that the number of slots in the rotor and consequently the number of pairs of bars carried by the rotor may be varied widely from the number given for purposes of illustration. There are numerous factors such as the size of the machine, its capacity, speed, etc., which will enter into a determination of the most desirable number of slots and paired bars in the rotor. All of such considerations are, however, well known to those familiar with the art of electric motor construction so that they will not be further treated at this point. It may be well to note, however, that if the number of slots in the rotor is an even number but not evenly divisible by the number of poles in the machine, the hunting effect of such extra bars will tend to cause the machine to run smoother than when the number of rotor bars is evenly divisible by the number of poles in the machine. A change in the proportional relationship between the number of pairs of rotor bars and the number of poles in the machine will have a certain effect upon the operating characteristics of the machine such as its starting torque and speed and this fact may be taken advantage of in the design of a machine for a particular purpose.

Attention is directed to the fact that in Figs. 5 and 6 the stator and rotor, respectively, of the machine are laid out in developed form so that the relative position of the windings of the two elements, as well as the arrangement of the windings in each element, may be better appreciated. The same reference characters used to designate certain parts in Fig. 1 have been used to designate similar parts in Figs. 5 and 6.

In Fig. 3 will be found a slight modification of the stator structure, the winding of such unit being substantially identical with that illustrated in Fig. 1. In Fig. 3 is shown a stator wherein I have not only proportioned the cross-sectional area of the pole projections in direct proportion to the ampere turn excitation thereof similarly to the stator illustrated in Fig. 1, but I have, in addition, deformed such pole projections so that they progressively, across each pole, are sloped toward the direction of rotation of the rotor and the degree of such slope being proportional to the ampere turn excitation of each projection resulting from the asymmetrical arrangement of the field windings.

This deformed pole projection arrangement, as illustrated in Fig. 3, results in a slightly different flux distribution from that resulting from the arrangement illustrated in Fig. 1 and this different distribution may be utilized to secure improved results in certain types of construction.

The rotor bars connected in pairs in the manner previously explained may be formed from any suitable material. I have found, however, that these paired rotor bars may be made very economically from sheet metal stampings as illustrated in Figs. 4 and 7. A substantially rectangular blank slightly curved laterally in its longitudinal extent and generally indicated at 10 is first cut from a flat strip of suitable material such as copper. The flat blank is then provided with a longitudinally extending central slot 11. The end portions 12 of the blank are then bent laterally with respect to each other in the fashion most clearly illustrated in Fig. 4 so as to bring the medial portions 13 of the blank into spaced planes. When the blank is thus formed, the sections 13 comprise the rotor bars and the rotor 2' may, therefore, be wound by merely placing a plurality of these blanks into the slots of the rotor with the medial portions of each blank respectively occupying different slots in the rotor.

After the rotor is wound by bars formed in the manner illustrated in Fig. 4, the terminal portions 12' of such bars extending beyond the opposite faces of the rotor may be radially inclined slightly by bending so as to, in effect, form the vanes of a fan as shown in Fig. 7. This arrangement is particularly effective to cool the machine for the reason that the rotor bars themselves act as heat drains carrying the heat from the laminated structure of the rotor outwardly to where it may be dissipated by radiation to the stream of air flowing over the ends of the rotor bars.

The operation of the herein described motor is briefly as follows:

The asymmetrical magnetic fields produced by the asymmetrical field windings force the conductors on the rotor from the stronger sides of such fields to the weaker. The motor is, therefore, rendered self-starting, even though only carrying a single-phase field winding. The starting torque characteristics of the motor are improved by the particular type of rotor employed. In a rotor of the squirrel-cage type, all the bars are connected together at both ends, thus the E. M. F. generated in one bar may, in effect, buck the E. M. F. generated in other bars under the same pole. When a rotor, according to my invention, is employed, this is not possible, but instead, the E. M. F. generated in each bar is properly combined with the E. M. F. generated in another bar under a different pole, thus setting up a plurality of couples or closed circuits with the E. M. F. generated in each bar or branch of such couple or circuit approximately the same. This is believed to be the reason for the improved starting torque characteristics demonstrated by motors embodying armatures constructed in accordance with my invention.

It should be noted that the asymmetrical magnetic field required to render the single-phase machine self-starting has been secured in the constructions illustrated and described herein by an asymmetrical arrangement of the windings on the stator. It is not possible, of course, to secure as marked deformation in the magnetic field by this arrangement as when the windings themselves are arranged as illustrated herein.

Other modes of applying the principle of my invention may be employed instead of the one explained, change being made as regards the mechanism herein disclosed, provided the means stated by any of the following claims or the equivalent of such stated means be employed.

I, therefore, particularly point out and distinctly claim as my invention:

1. In a single phase alternating-current motor, a stator with a single winding and having its iron and its winding-turns both in circumferentially progressive increasement from each pole to the next and comprising a plurality of pole projections of progressively increased section in the direction of rotation of the rotor, and a rotor having as its conductors loops of sheet metal of straight strip form slit centrally into parallel portions lying in spaced-apart rotor-slots and with the ends all bent inwardly.

2. In a single phase alternating current motor, a stator with a single winding and having its iron and its winding-turns both in circumferentially progressive increasement from each pole to the next and comprising a plurality of pole projections of progressively greater inclination in the direction of rotation of the rotor, and a rotor having as its conductors loops of sheet metal of straight strip form slit centrally into parallel portions lying in spaced-apart rotor-slots and with the ends all bent inwardly.

3. In a single phase alternating current motor, a stator with a single winding and having its iron and its winding-turns both in circumferentially progressive increasement from each pole to the next and comprising a plurality of pole projections of progressively greater inclination in the direction of rotation of the rotor.

4. In a single phase alternating current motor, a stator with a single winding and having its iron and its winding-turns both in circumferentially progressive increasement from each pole to the next and comprising a plurality of pole projections of progressively increased section in the direction of rotation of the rotor, said pole sections being also of progressively greater inclination in the direction of rotation of the rotor.

5. In a single phase alternating-current motor, a stator with a single winding and each pole thereof having its iron and its winding-turns both in circumferentially progressive increasement from each pole to the next, and a rotor having as its conductor bars arranged in pairs and respective bars of each pair being connected in series, the bars being separated parallel portions of loops of sheet metal of straight strip form slit centrally and with the ends all bent inwardly.

EARL P. OSWALD.